United States Patent
Okochi (10) Patent No.: US 7,400,973 B2
(45) Date of Patent: Jul. 15, 2008

(54) NAVIGATION APPARATUS FOR ROUTE SEARCH

(75) Inventor: Masaru Okochi, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 123 days.

(21) Appl. No.: 11/054,360

(22) Filed: Feb. 8, 2005

(65) Prior Publication Data
US 2005/0192742 A1    Sep. 1, 2005

(30) Foreign Application Priority Data
Feb. 10, 2004    (JP)    ............................ 2004-034304

(51) Int. Cl.
*G01C 21/34* (2006.01)
(52) U.S. Cl. .................. 701/209; 340/995.19; 701/202
(58) Field of Classification Search .................. 701/209; 340/995.19
See application file for complete search history.

(56) References Cited

U.S. PATENT DOCUMENTS 5,802,492 A * 9/1998 DeLorme et al. ......... 455/456.5
5,931,888 A * 8/1999 Hiyokawa .................... 701/208
2003/0033084 A1 * 2/2003 Corcoran, III ............... 701/301

FOREIGN PATENT DOCUMENTS

| JP | 09-126801 | 5/1997 |
| JP | 2000-304561 | 11/2000 |

* cited by examiner

*Primary Examiner*—Khoi H. Tran
*Assistant Examiner*—Jonathan Goldfarb
(74) *Attorney, Agent, or Firm*—Brinks Hofer Gilson & Lione (57) ABSTRACT

There is provided a "navigation apparatus", a "route search method", and a "program" which provide routes meeting the actual requirements and preferences of respective drivers. The navigation apparatus 1 according to the present invention including a function of carrying out a route search to a set destination, and then providing a route guidance according to a search result, includes a route search processing section 26 that searches for routes based on predetermined search conditions specific to a user in predetermined first areas, and searches for routes based on predetermined recommended search conditions in second areas different from the first areas. In addition, the route search processing section 26 distinguishes between the first areas and the second areas reflecting travel histories of a vehicle, search conditions set previously, and registered contents.

9 Claims, 8 Drawing Sheets

| | DISTINGUISHED AREA | SEARCH CONDITION | PREFERRED ROADS |
|---|---|---|---|
| FUKUSHIMA | FIRST AREA | SEARCH CONDITIONS SPECIFIC TO USER | NON-EXPRESSWAYS |
| IBARAKI | SECOND AREA | SEARCH CONDITIONS RECOMMENDED BY NAVIGATION APPARATUS | EXPRESSWAYS |
| TOKYO | SECOND AREA | SEARCH CONDITIONS RECOMMENDED BY NAVIGATION APPARATUS | EXPRESSWAYS |
| OSAKA | SECOND AREA | SEARCH CONDITIONS RECOMMENDED BY NAVIGATION APPARATUS | EXPRESSWAYS |

FIG. 2

|  |  |  | (1) | (2) | (3) | (4) | (5) | (6) | (7) | (8) | (9) | (10) | ... |
|---|---|---|---|---|---|---|---|---|---|---|---|---|---|
| ADMINISTRATIVE DISTRICT | FUKUSHIMA | A | | | | | | | | | | | |
| | | B | | | | | | | | | | | |
| | | C | | | | | | | | | | | |
| | IBARAKI | D | | | | | | | | | | | |
| | | E | | | | | | | | | | | |
| | | F | | | | | | | | | | | |
| TOURIST COURSE | | O | | | | | | | | | | | |
| | | P | | | | | | | | | | | |
| | | Q | | | | | | | | | | | |

(1) RESIDENTIAL ADDRESS
(2) NUMBER OF OFF-ROUTES
(3) MARK LIST
(4) NUMBER OF TRAVEL TRAJECTORIES
(5) DESTINATION HISTORY
(6) NUMBER OF MAP SEARCHES
(7) EXPRESSWAYS
(8) NON-EXPRESSWAYS
(9) DISTANCE
(10) ROAD WIDTH

FIG. 3

|  | DISTINGUISHED AREA | SEARCH CONDITION | PREFERRED ROADS |
|---|---|---|---|
| FUKUSHIMA | FIRST AREA | SEARCH CONDITIONS SPECIFIC TO USER | NON-EXPRESSWAYS |
| IBARAKI | SECOND AREA | SEARCH CONDITIONS RECOMMENDED BY NAVIGATION APPARATUS | EXPRESSWAYS |
| TOKYO | SECOND AREA | SEARCH CONDITIONS RECOMMENDED BY NAVIGATION APPARATUS | EXPRESSWAYS |
| OSAKA | SECOND AREA | SEARCH CONDITIONS RECOMMENDED BY NAVIGATION APPARATUS | EXPRESSWAYS |

FIG.4

```
        DESTINATION SETTING

TELEPHONE NUMBER —41

ADDRESS —42

FACILITY NAME —43

SELECT [  ] YOU WANT
```

FIG.5

```
        SEARCH CONDITIONS 51        52
        TRANSIT LOCATION  SPECIFY   NOT SPECIFY

SELECT [  ] YOU WANT
```

NAVIGATION APPARATUS FOR ROUTE SEARCH

BACKGROUND OF THE INVENTION

1. Field of the Invention

The present invention relates to a navigation apparatus, a route search method, and a program.

2. Description of the Related Art

Conventionally, there have been proposed navigation apparatuses which provide a function of carrying out a route search to a destination, and then subsequently providing a route guidance based on a search result. On the above navigation apparatuses, the route search is carried out using search conditions which minimize the time required to arrive at the destination from the present location, search conditions which minimize the distance along a route from the present location to the destination, search conditions which minimize the toll required for the travel from the present location to the destination, and the like.

A navigation apparatus according to Japanese Laid-Open Patent Publication (Kokai) No. H9-126801 is provided with means which, upon there being a plurality of roads such as expressways, urban expressways, and local roads, including prefectural roads and the like close to a desired transit location, allows a user to select from them so as to guide to a user selected location.

A navigation apparatus according to Japanese Laid-Open Patent Publication (Kokai) No. 2000-304561 searches for a guide route from a start point to an end point based on the priorities of a plurality of variable search conditions so as to allow a selection of a desired route faster.

However, there is a problem in that a route search cannot be carried out according to the actual requirements and preferences of respective drivers according to a route search method based on fixed search conditions as in the navigation apparatuses disclosed in the above patent documents.

SUMMARY OF THE INVENTION

The present invention is devised to solve the above problem, and has an object of providing a navigation apparatus, a route search method, and a program which provide a route meeting the requirements and preferences of respective drivers.

To solve the above problem, a navigation apparatus according to the present invention including a function of carrying out a route search to a set destination, and then providing a route guidance according to a search result is characterized by comprising a route search processing section that searches for routes based on predetermined search conditions specific to a user in predetermined first areas, and searches for routes based on predetermined recommended search conditions in second areas different from the first areas.

According to the present invention, the routes are searched for based on the predetermined search conditions specific to the user in the first areas where the user drives frequently, the routes are searched for based on the search conditions recommended by the navigation apparatus in the second areas where the user drives infrequently, and there may be thus provided routes meeting the requirements and preferences of the respective drivers.

Moreover, the present invention is characterized in that the route search processing section distinguishes between the first areas and the second areas based upon the travel histories of a vehicle. According to the present invention, the first areas and the second areas may be distinguished based upon the travel histories of the vehicle.

Moreover, the present invention is characterized in that the route search processing section distinguishes between the first areas and the second areas based upon search conditions previously set. According to the present invention, the first areas and the second areas may be distinguished based upon the search conditions previously set.

Moreover, the present invention is characterized in that the route search processing section distinguishes between the first areas and the second areas based upon predetermined registered contents. According to the present invention, the first areas and the second areas may be distinguished upon the registered contents such as the residential address.

Moreover, the present invention is characterized in that the route search processing section searches for routes without changing the search conditions on sections before and after transit locations. According to the present invention, there may be provided routes to the set destination meeting the preferences of the driver.

Moreover, the present invention is characterized in that, upon there being a plurality of search conditions, the route search processing section searches for routes based upon the priority of the search conditions. According to the present invention, upon there being a plurality of search conditions, the routes are searched for upon reflection of the priority of search conditions so that there may be provided routes desired more by the driver.

Moreover, the present invention is characterized in that the route search processing section uses the registered contents having the latest date. According to the present invention, the routes are searched for using the registered contents having the latest date so that there may be provided routes meeting the latest requirements and preferences of the driver.

Moreover, the present invention in the above configuration is characterized by further comprising a user interface that, upon there being a plurality of search conditions, allows a change in the priority of the search conditions. According to the present invention, since the priorities can be changed, there may be thus provided routes desired more by the user.

Moreover, a navigation apparatus according to the present invention including a function of carrying out a route search to a set destination, and then providing a route guidance according to a search result is characterized by comprising a route search processing section that searches for routes based upon the travel histories of a vehicle. According to the present invention, since the routes are searched for based upon the travel histories of the vehicle, roads frequently used are identified, for example, and there may be provided routes meeting the requirements and preferences of the respective drivers.

Moreover, a navigation apparatus according to the present invention including a function of carrying out a route search to a set destination, and then providing a route guidance according to a search result is characterized by comprising a route search processing section that searches for routes based upon search conditions previously set. According to the present invention, since the routes are searched for based upon the search conditions previously set by the user, there may be provided routes meeting the requirements and preferences of the respective drivers.

Moreover, a route search method according to the present invention for searching for routes based on a set destination is characterized by comprising a route search processing step of searching for routes based on predetermined search conditions specific to a user in predetermined first areas, and searching for routes based on predetermined recommended search conditions in second areas different from the first areas. According to the present invention, the routes are searched for based on the predetermined search conditions specific to the user in the first areas where the user drives frequently, the routes are searched for based on the search conditions recommended by a navigation apparatus in the second areas where the user drives infrequently, and there may be thus provided routes meeting the requirements and preferences of the respective drivers.

Moreover, the present invention in the above configuration is characterized by further comprising a step of distinguishing between the first areas and second areas based upon the travel histories of a vehicle. According to the present invention, the first areas and the second areas may be distinguished based upon the travel histories of the vehicle.

Moreover, the present invention in the above configuration is characterized by further comprising a step of distinguishing between the first areas and second areas based upon search conditions previously set. According to the present invention, the first areas and the second areas may be distinguished based upon the search conditions previously set.

Moreover, the present invention in the above configuration is characterized by further comprising a step of distinguishing between the first areas and second areas based upon predetermined registered contents. According to the present invention, the first areas and the second areas may be distinguished based upon the registered contents such as the residential address.

Moreover, the present invention in the above configuration is characterized by further comprising a step of, upon there being a plurality of search conditions, searching for routes based upon the priority of search conditions. According to the present invention, upon there being a plurality of search conditions, the routes are searched for based upon the priority of search conditions so that there may be provided routes desired more by the driver.

A route search method according to the present invention for searching for routes based on a set destination is characterized by comprising a travel history storing step of recording travel histories of a vehicle, and a route search step of searching for routes based upon the travel histories of the vehicle. According to the present invention, since the routes are searched for based upon the travel histories of the vehicle, roads used frequently are identified, for example, and there may be thus provided routes meeting the requirements and preferences of the respective drivers.

A route search method according to the present invention for searching for routes based on a set destination is characterized by comprising a search condition storing step of storing search conditions previously set, and a route search step of searching for routes based upon the search conditions previously set. According to the present invention, since the routes are searched for based upon the search conditions previously set by the user, there may be provided routes meeting the requirements and preferences of the respective drivers.

A program according to the present invention for searching for routes based on a set destination causing a computer to function as means for searching for routes based on predetermined search conditions specific to a user in predetermined first areas, and searching for routes based on predetermined recommended search conditions in second areas different from the first areas. According to the present invention, the routes are searched for based on the predetermined search conditions specific to the user in the first areas where the user drives frequently, the routes are searched for based on the search conditions recommended by a navigation apparatus in the second areas where the user drives infrequently, and there may be thus provided routes meeting the requirements and preferences of the respective drivers.

A program according to the present invention for searching for routes based on a set destination causing a computer to function as travel history storing means for storing travel histories of a vehicle onto a predetermined memory, and route search means for searching for routes based upon the travel histories of the vehicle. According to the present invention, since the routes are searched for based upon the travel histories of the vehicle, roads frequently used are identified, and there may be thus provided routes meeting the requirements and preferences of the respective drivers.

A program according to the present invention for searching for routes based on a set destination causing a computer to function as search condition storing means for storing search conditions set previously onto a predetermined memory, and route search means for searching for routes based upon the previous search conditions. According to the present invention, since the routes are searched for based upon the search conditions previously set by the user, there may be provided routes meeting the requirements and preferences of the respective drivers.

According to the present invention, there is provided a navigation apparatus, a route search method, and a program implementing the route search method which provide routes meeting the requirements and preferences of respective drivers.

DETAILED DESCRIPTION OF THE PREFERRED EMBODIMENTS

A description will now be given of best modes for embodying the present invention.

First Embodiment

Figure 1:
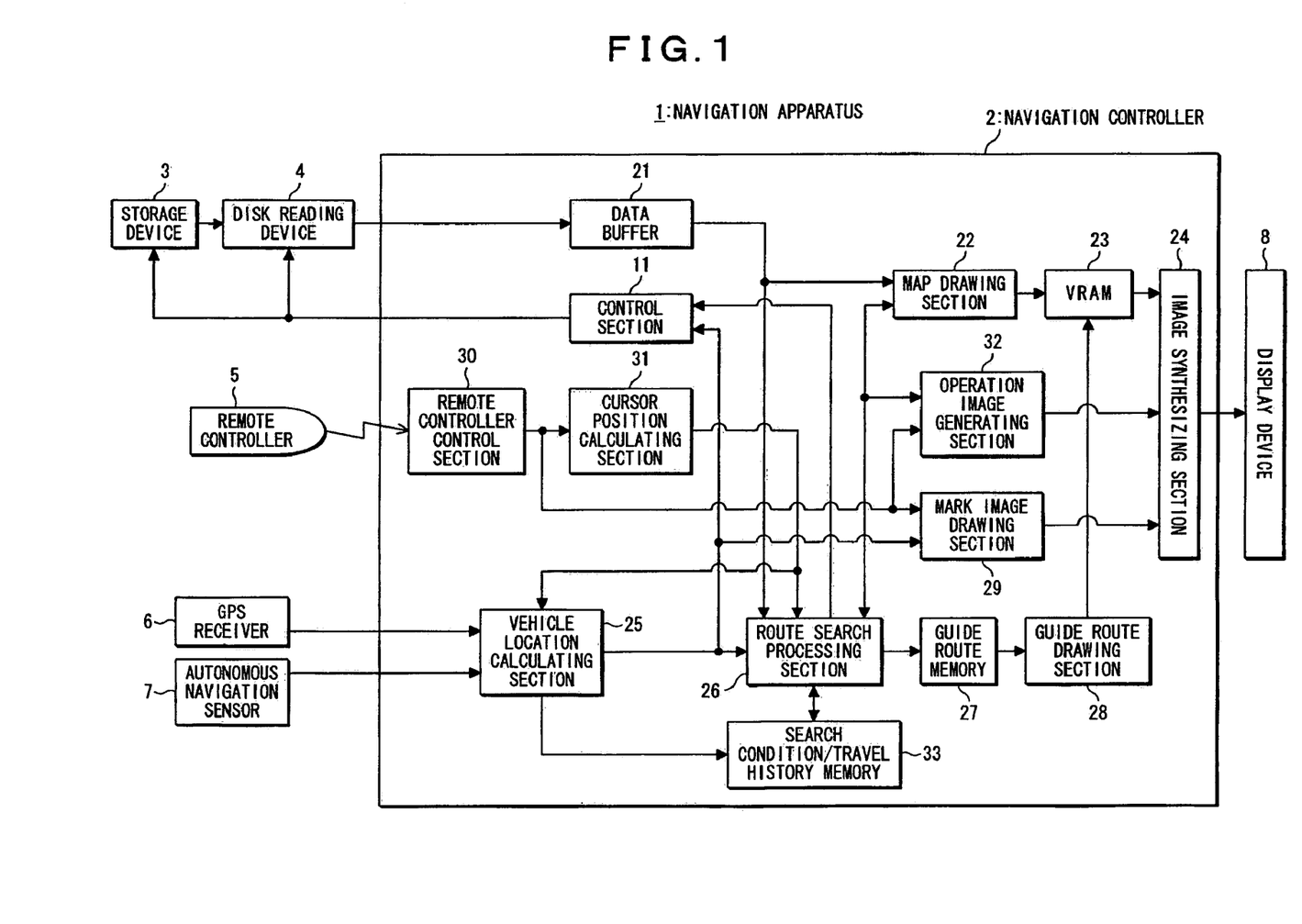
FIG. 1 describes a navigation apparatus according to a first embodiment.

FIG. 1 describes a navigation apparatus according to a first embodiment. As shown in FIG. 1, the navigation apparatus 1 is provided with a navigation controller 2, a storage device 3, a disk reading device 4, a remote control unit 5, a GPS receiver 6, an autonomous navigation sensor 7, and a display device 8. The navigation apparatus 1 is provided with a function of carrying out a route search to a set destination, and subsequently providing a route guidance based on a search result.

The navigation controller 2 is constituted by a CPU (Central Processing Unit), a ROM (Read Only Memory), and a RAM (Random Access Memory), and controls the entire navigation apparatus 1. The storage device 3 is constituted by a hard disk, a DVD-RW (DVD Rewritable), and the like, and stores a map data file which stores map information required for the route guidance, for example, an intersection data file which stores information on intersections, a road data file which stores information on roads such as road types and a start point and an end point of respective roads, a node data file which stores the east longitude and north latitude of respective points on roads, a guide point data file which stores position coordinates, guide information, and the like of landmarks such as facilities according to applications categorized by a genre such as gas stations and convenience stores.

The storage device 3 adapts to map data having a hierarchical structure, and stores data for the route search hierarchized from a lower level having a large quantity of information on a road network to a higher level having a small quantity of the information on the road network. The disk reading device 4 reads out the data recorded on the storage device 3. The remote controller 5 is used by a user to input various instructions, and includes various operation keys such as a search key used to give a route search instruction, a route guidance mode key used to set a route guidance mode, a destination input key, cursor keys used for up/down and left/right movements, zoom in/out keys used to zoom in/out a map, and a set key to confirm an item under a cursor on a display screen. A user operates the remote controller 5 so as to input information required to set a start location, and destinations such as transit locations. In addition, the user can use the remote controller 5 to input an address, a telephone number, and a coordinate so as to set the start location and the destinations such as the transit locations.

The GPS receiver 6 receives radio waves transmitted from a plurality of GPS satellites, carries out three-dimensional or two-dimensional positioning so as to calculate the absolute location and orientation of a vehicle, and outputs them along with the measurement time. The autonomous navigation sensor 7 is provided with an angle sensor such as a vibration gyro, which detects a vehicle turning angle as a relative direction, and a distance sensor, which outputs one pulse every predetermined travel distance, so as to calculate the relative location and direction of the vehicle.

The display device 8 is constituted by a liquid crystal display or the like, and displays a map image near the own vehicle, a vehicle location mark, a start location mark, a destination mark, a guide route, a destination setting screen, and the like based on drawing data output from the navigation controller 2. Furthermore, touch switches or buttons which represent corresponding function keys are shown on the display device 8. The user can use the touch switches to carry out the destination setting and the like.

A description will now be given of the navigation controller 2. As shown in FIG. 1, the navigation controller 2 is provided with a data buffer 21, a map drawing section 22, a VRAM (Video RAM) 23, an image synthesizing section 24, a vehicle location calculating section 25, a route search processing section 26, a guide route memory 27, a guide route drawing section 28, a mark image drawing section 29, a remote controller control section 30, a cursor position calculating section 31, an operation image generating section 32, and a search condition/travel history memory 33.

The CPU described above loads a predetermined program from a predetermined storage device so as to realize the respective functions shown in FIG. 1 on the navigation controller 2. Note that the predetermined program includes programs set forth in the claims.

The data buffer 21 temporarily stores the map data in the hierarchical structure read out by the disk reading device 4 from the storage device 3. The map drawing section 22 creates map drawing data to be displayed based on the map data stored in the data buffer 21. The image synthesizing section 24 carries out image synthesis by superposing the map drawing data read out from the VRAM 23, and drawing data output respectively from the guide route drawing section 28, the mark image drawing section 29, and the operation image generating section 32, and then outputs synthesized drawing data to the display device 8. The vehicle location calculating section 25 calculates the location of the own vehicle based on the respective detected data from the GPS receiver 6 and the autonomous navigation sensor 7. Moreover, the vehicle location calculating section 25 stores the own vehicle location associated with time information as a vehicle travel history into the search condition/travel history memory.

The route search processing section 26 searches for routes between the destination and start location set in advance under predetermined search conditions. The route search processing section 26 searches for routes using predetermined search conditions specific to the user in first areas where the user drives frequently, and searches for routes using predetermined recommended search conditions in second areas where the user drives infrequently. If the route search processing section 26 carries out the search under the search conditions recommended by the navigation apparatus 1, routes having the lowest cost are searched for under conditions such as the minimum distance and the minimum travel time, for example.

Moreover, the route search processing section 26 distinguishes the first areas where the user drives frequently and the second areas where the user drives infrequently based upon the travel histories of the vehicle, search conditions previously set, and contents registered to the navigation apparatus 1. On this occasion, the route search processing section 26 preferably uses the latest or most recent items upon using the travel histories of the vehicle, search conditions previously set, or contents registered to the navigation apparatus 1. Moreover, the route search processing section 26 carries out a function of storing the search conditions previously set by the user, and the search conditions recommended by the navigation apparatus 1 into the search condition/travel history memory 33.

The guide route memory 27 stores data of the guide route searched by the route search processing section 26. The guide route drawing section 28 selects a portion presently contained in a map area drawn on the VRAM 23 from the guide route data stored on the guide route memory 27, and generates guide route drawing data used to display the guide route over the map image. The mark image drawing section 29 creates drawing data to generate the vehicle location mark at the location of the vehicle, a cursor mark in a predetermined shape, and the like.

The search condition/travel history memory 33 stores the travel histories of the vehicle supplied from the vehicle location calculating section 25, the search conditions previously set supplied from the route search processing section 26, the registered contents to the navigation apparatus 1, the residential address, the number of off-routes, a mark list, the number of travel trajectories, a destination history, the number of map searches, expressways, non-expressways, distances, and road widths associated with the time information respectively for predetermined areas. The predetermined areas include administrative districts, tourist courses, and the like. The above information stored in the search condition/travel history memory 33 is calculated by the route search processing section 26 based on the registered contents to the navigation apparatus 1, the search conditions set previously, the travel histories of the vehicle, and the like.

Figure 2:
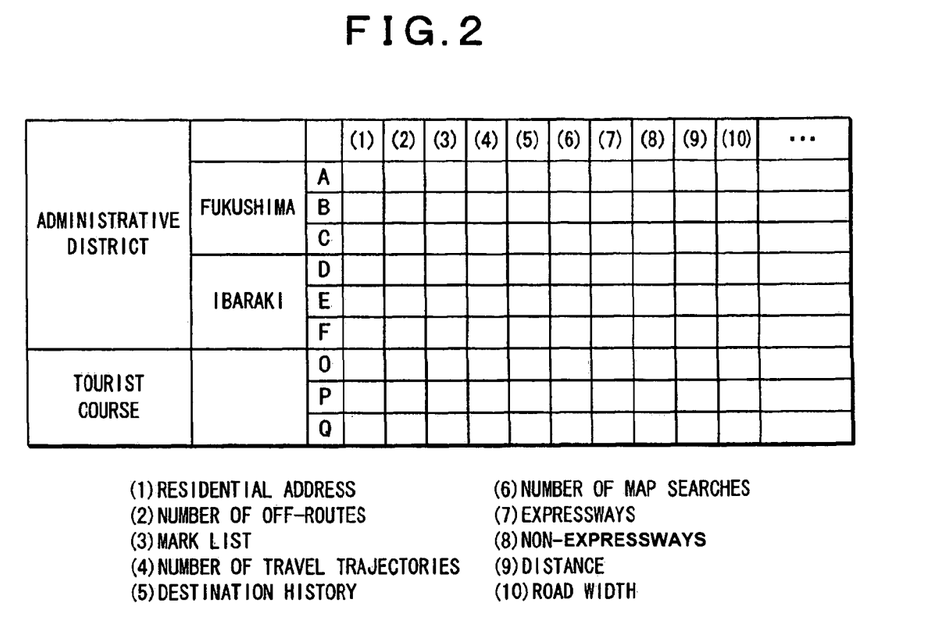
FIG. 2 shows a table in a search condition/travel history memory 33.

FIG. 2 shows a table in the search condition/travel history memory 33. As shown in FIG. 2, the search condition/travel history memory 33 stores (1) Residential address, (2) Number of off-routes, (3) Mark list, (4) Number of trajectories, (5) Destination history, (6) Number of map searches, (7) Number of expressways, (8) Number of non-expressways, (9) Distance, and the like respectively for predetermined areas such as administrative districts A to F, and tourist courses O to Q.

The route search processing section 26 refers to the table in the search condition/travel history memory 33 so as to distinguish between the first areas where the user travels frequently and the second areas where the user travels infrequently. If an area includes the residential address, the route search processing section 26 determines that the area as the first area where the user drives frequently. If an area includes a large number of the off-routes, it is assumed that the user has a sense of locality of the area, and the route search processing section 26 thus determines the area as the first area where the user drives frequently. If an area is registered to the mark list, it is assumed that the user has a sense of locality of the area, and the route search processing section 26 thus determines the area as the first area where the user drives frequently, and if an area includes a large number of travel trajectories, it indicates that the user has driven around the area, and the route search processing section 26 thus determines the area as the first area where the user drives frequently, for example.

If an area neighbors destinations previously set, it indicates that the user has previously driven around the area, and the route search processing section 26 thus determines the area as the first area where the user drives frequently. If a map search is frequently carried out in an area, it indicates that the user has seen maps around the area, and the route search processing section 26 thus determines the area as the first area where the user drives frequently. If the user frequently drives on expressways in an area, it indicates that the user does not know non-expressways in the area, and the route search processing section 26 thus determines the area as the second area where the user drives infrequently. If the user frequently drives on non-expressways in an area, the route search processing section 26 thus determines the area as the first area where the user drives frequently, and if travel distances are long in an area, the route search processing section 26 thus determines the area as the first area where the user drives frequently. If an area is any of the tourist courses O to Q, the route search processing section 26 thus determines the area as the second area where the user drives infrequently.

Figure 3:
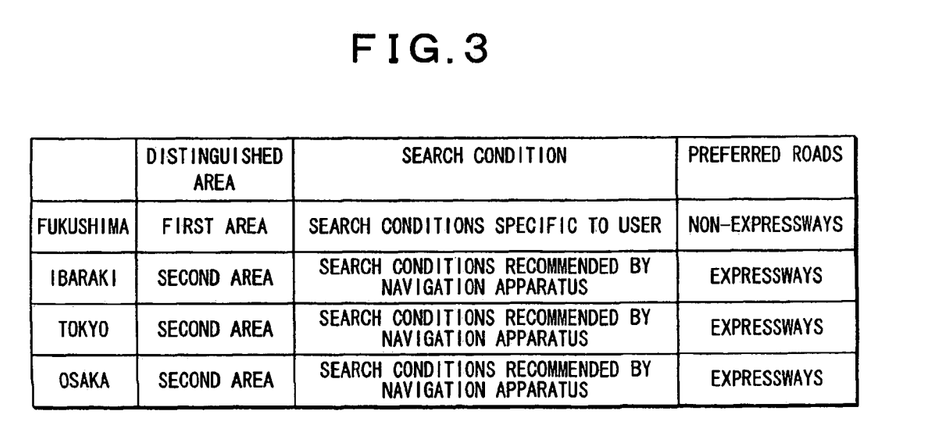
FIG. 3 describes how to select search conditions.

A description will now be given of how to select the search conditions. FIG. 3 describes how to select search conditions. It is assumed that the navigation apparatus 1 is used to search for routes from Fukushima prefecture to Osaka prefecture via Ibaraki prefecture and Tokyo metropolis. The description will be given while assuming that the user has a residence in Fukushima prefecture, and does not has a sense of locality of Ibaraki prefecture, Tokyo metropolis, and Osaka prefecture.

The route search processing section 26 refers to the table in the search condition/travel history memory 33 so that areas along the routes from the Fukushima prefecture to Osaka prefecture via Ibaraki prefecture and Tokyo metropolis are distinguished as the first areas where the user drives frequently and the second areas where the user drives infrequently. In the example shown in FIG. 3, since the residence is present in Fukushima prefecture, the route search processing section 26 determines areas in Fukushima prefecture as the first areas where the user drives frequently, and areas in Ibaraki prefecture, Tokyo metropolis, and Osaka prefecture as the second areas where the user drives infrequently.

The route search processing section 26 then searches for routes using search conditions specific to the user in the first areas where the user drives frequently. The search conditions specific to the user imply conditions which result in there being searched roads on which the user usually drives. In the example shown in FIG. 3, the search for the routes using the search conditions specific to the user results in routes preferring non-expressways. The route search processing section 26 searches for routes using the search conditions recommended by the navigation apparatus 1 in the second areas where the user drives infrequently. In the example shown in FIG. 3, the search for the route using the search conditions recommended by the navigation apparatus 1 results in routes preferring expressways.

Since the route search processing section 26 searches for the routes using the search conditions specific to the user in the first areas where the user drives frequently, and searches for the routes using the search conditions recommended by the navigation apparatus 1 in the second areas where the user drives infrequently in this way, it is possible to provide routes meeting the requirements and preferences of the respective drivers.

A description will now be given of inputs to set a destination. For the inputs to set a destination, selection operation is repeated on a facility list and the like to obtain a registered destination stored in the storage device 3 in advance, and the registered destination can be set as the destination.

Figure 4:
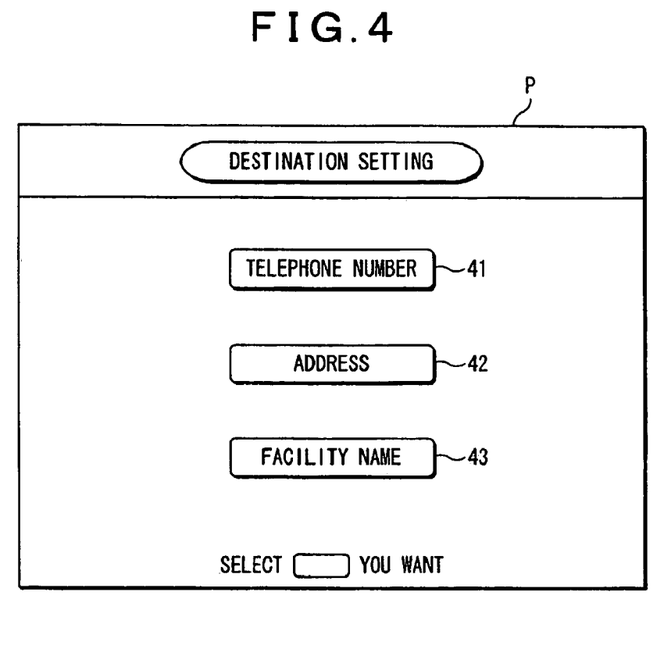
FIG. 4 shows an example of a screen used to select destination settings.

FIG. 4 shows an example of a screen used to select destination settings. This screen is shown on the display device 8. On the destination setting screen P are provided keys 41 to 43 used to select a phone number, an address, and a facility name as methods to input the destination. If a phone number key 41 is pressed, the user can input a phone number so as to set the destination, and if an address key 42 is pressed, the user can input an address to set the destination. If a facility name key 43 is pressed, a facility list appears, and the user can view the following messages shown on the screen so as to set the destination.

Figure 5:
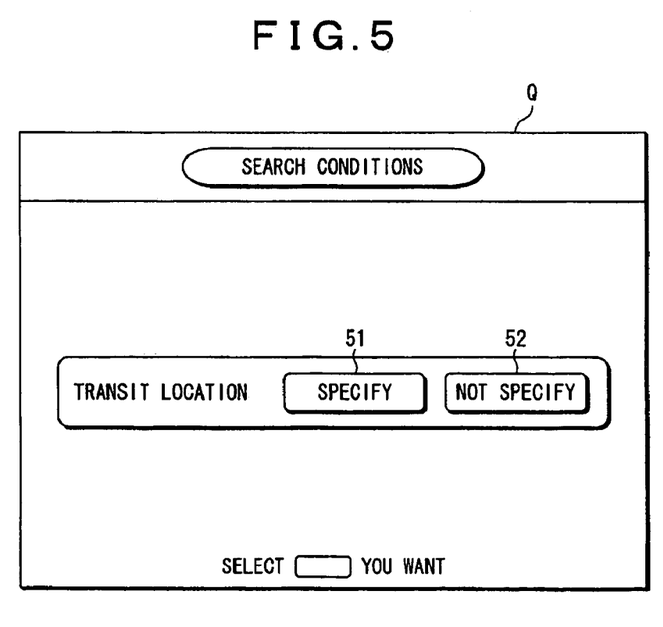
FIG. 5 shows an example of a search condition setting screen.

If the user finishes the destination setting, a search condition setting screen Q appears. FIG. 5 shows an example of the search condition setting screen. Transit locations can be set as the search condition. On the search condition setting screen Q are provided keys 51, 52 used to select "Specify" or "Not specify" for the transit locations. If the user wants to set the transit locations as the search condition, the user selects "Specify".

Figure 6:
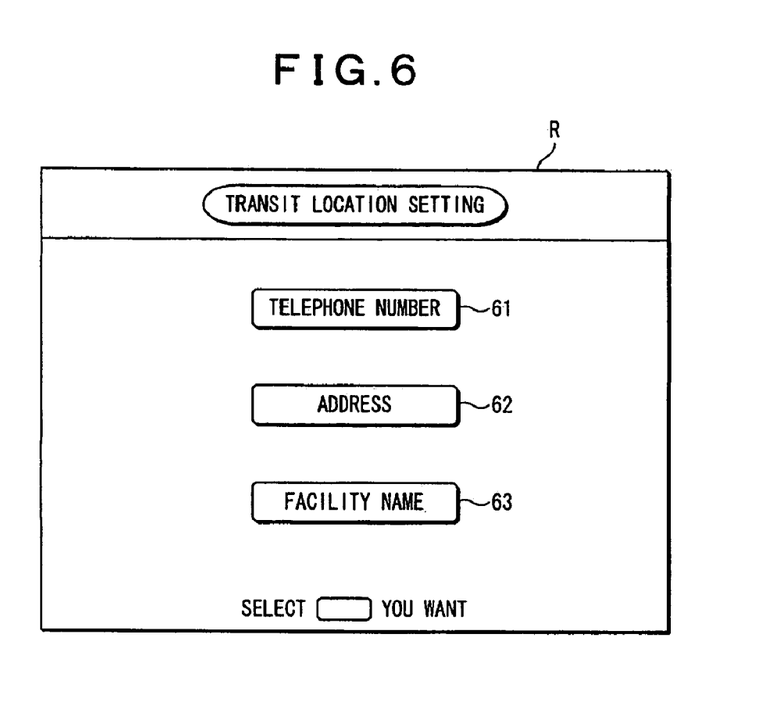
FIG. 6 shows an example of a transit location setting screen R.

If the user selects "Specify" the transit locations, a transit location setting screen R appears. FIG. 6 shows an example of the transit location setting screen R. As shown in FIG. 6, on the transit location setting screen R are provided a telephone number key 61, an address key 62, and a facility name key 63 as keys to set the transit locations. If the user presses the telephone number key 61, the user can input a telephone number so as to set the transit location, if the user presses the address key 62, the user can input an address so as to set the transit location, and if the user presses the facility name key 63, a facility list appears, and the user can select a desired facility name so as to set the transit location.

Figure 7:
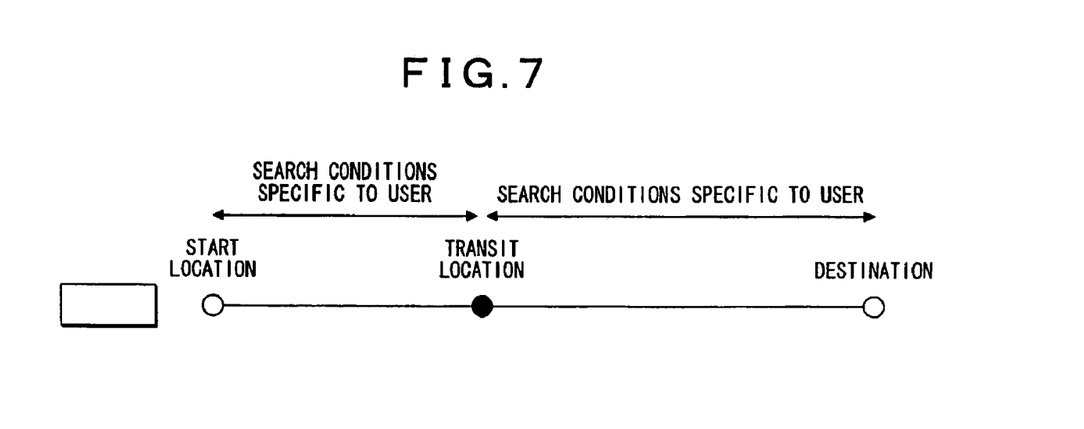
FIG. 7 describes how far there are applied search conditions specific to a user.

FIG. 7 describes how far there are applied the search conditions specific to the user. As shown in FIG. 7, if the route search processing section 26 determines that the entire areas from the start location to the destination as the first areas where the user drives frequently, the route search processing section 26 searches for the routes using the search conditions specific to the user on the entire areas on both sides of the transit location.

Figure 8:
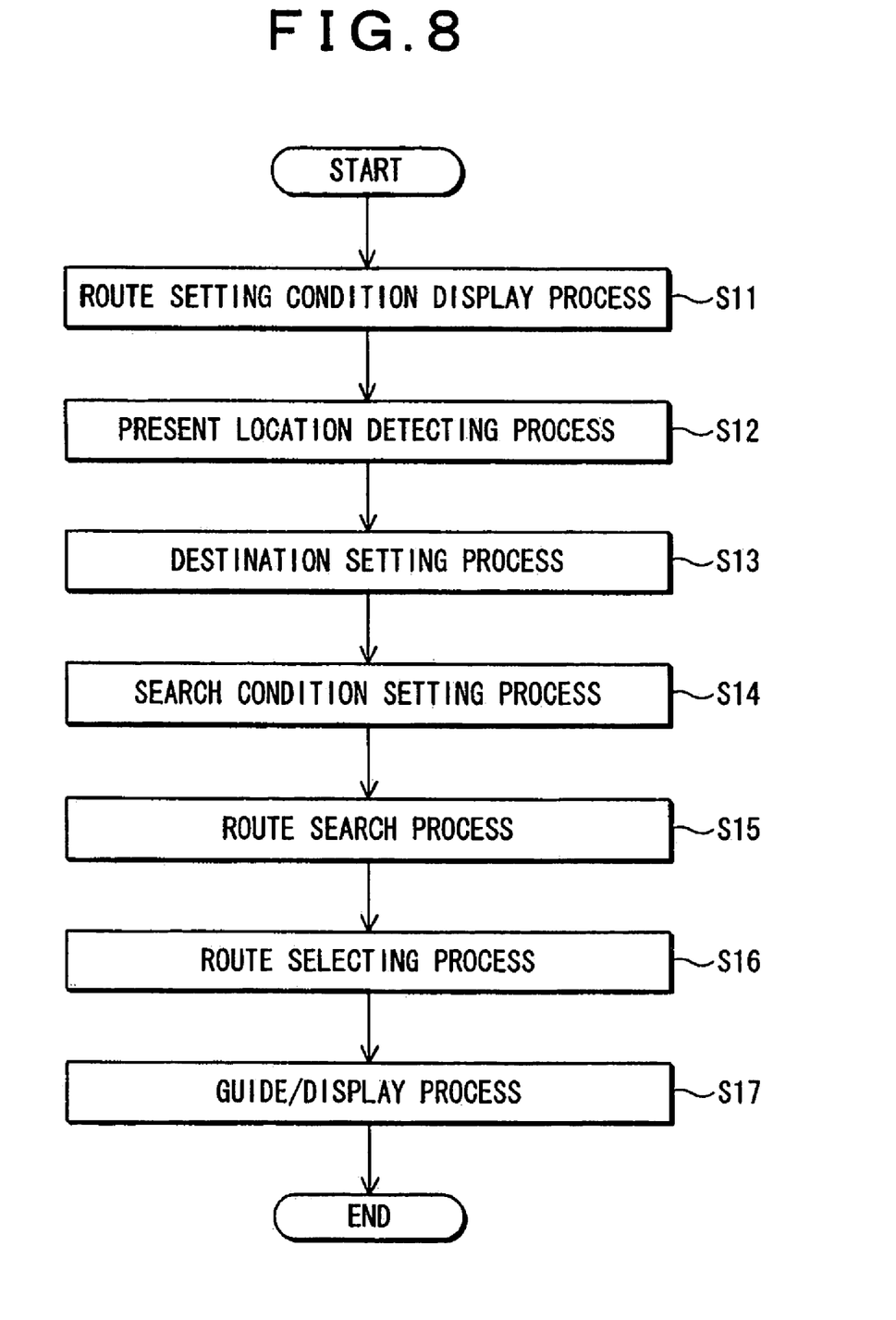
FIG. 8 is a processing flowchart for a route search of a navigation apparatus 1 according to the first embodiment.

A description will now be given of the route search processing of the navigation apparatus 1 according to the present embodiment. FIG. 8 is a processing flowchart for the route search of the navigation apparatus 1 according to the first embodiment. The processing shown in FIG. 8 starts upon the power being turned on, and ends upon the power being turned off. The turning on and off of the power is carried out by turning on/off the power of the navigation apparatus 1, or by turning on/off of the engine start key (ignition switch) of the vehicle.

A route setting condition display process in a step S11 shows the user a route setting condition screen on the display device 8. A present location detecting process in a step S12 detects the geographic coordinates (latitude, longitude, and height) of a mobile body carrying the navigation apparatus 1. Specifically, the GPS receiver 6 receives the radio waves from a plurality of satellites orbiting around the earth. The coordinate positions of the satellites, the time when the radio waves are transmitted from the respective satellites, and the time when the radio waves are received on the GPS receiver 6 are detected based on the radio waves from the respective satellites. The distances to the respective satellites are calculated from the above information. The obtained coordinate position of the mobile body is output from the vehicle location calculating section 25 to the route search processing section 26 as present location data.

A destination setting process in a step S13 shows the destination setting screen P shown in FIG. 4, carries out the search based on an input telephone number upon setting the destination using the telephone number, for example, obtains map data at the destination, and shows a cursor on the map. The destination setting ends at this point. If the destination setting is completed, confirmation screen display processing is carried out, and the user can confirm the set destination on a confirmation screen.

A search condition setting process in a step S14 shows the search condition setting screen Q shown in FIG. 5 so that various search conditions are set. Specifically, the route search processing section 26 refers to the table in the search condition/travel history memory 33 so that areas from the start location to the destination are distinguished as the first areas where the user drives frequently and the second areas where the user drives infrequently. The route search processing section 26 sets the search conditions specific to the user in the first areas where the user drives frequently, and sets the search conditions recommended by the navigation apparatus 1 in the second areas where the user drives infrequently.

A route search process in a step S15 searches for a plurality of routes from start position data to destination data. The routes are searched for under the search conditions specific to the user in the first areas where the user drives frequently, and the routes are searched for under the search conditions recommended by the navigation apparatus 1 in the second areas where the user drives infrequently. A route selecting process in a step S16 selects one route from the plurality of routes upon the route search process in the step S15 having searched the plurality of routes. A guide/display process in a step S17 shows the guide route selected by the route selecting process in the step S16 on the display device 8.

According to the first embodiment, the routes are searched for based on the predetermined search conditions specific to the user in the first areas where the user drives frequently, the routes are searched for based on the search conditions recommended by the navigation apparatus in the second areas where the user drives infrequently, and there are thus provided routes meeting the requirements and preferences of the respective drivers.

Second Embodiment

Figure 9:
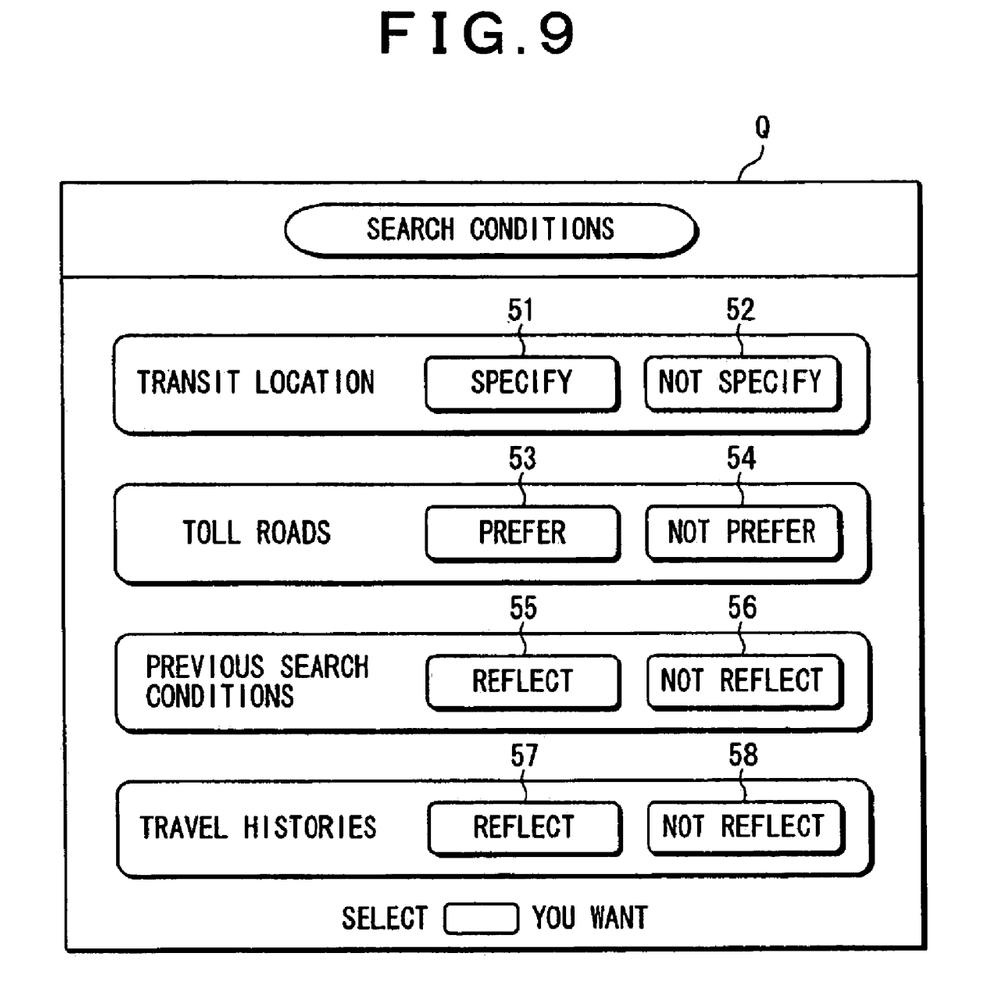
FIG. 9 shows an example of a search condition setting screen according to a second embodiment.

A description will now be given of a second embodiment. A navigation apparatus according to the second embodiment has the same configuration as the navigation apparatus described in the first embodiment, and the description is thus given with reference to FIG. 1. A description is first given of a search condition setting screen according to the second embodiment. FIG. 9 shows an example of the search condition setting screen according to the second embodiment. If the search conditions are not set upon the route search, routes to a destination are searched for under search conditions recommended by the navigation apparatus 1. The search conditions recommended by the navigation apparatus are usually set to minimize the time or distance.

The search condition setting screen according to the second embodiment is configured to set search conditions specific to the user. Transit locations can be set as the search condition. On the search condition setting screen Q are provided keys 51, 52 used to select "Specify" or "Not specify" for the transit locations. If the user wants to set the transit locations as the search condition, the user selects "Specify". Moreover, there are provided keys 53, 54 used to select "Prefer" or "Not prefer" for the toll roads, and the user specifies "Prefer" upon preferring the toll roads.

Moreover, there are provided keys 55, 56 used to select "Reflect" or "Not reflect" for previous search conditions, and the user specifies "Reflect" for searching upon reflection of the previous search conditions. Consequently, there are set search conditions upon reflection of the previous search conditions. Moreover, there are provided keys 57, 58 used to select "Reflect" or "Not reflect" for travel histories, and the user specifies "Reflect" for searching upon reflection of the travel histories of the vehicle. Consequently, there are set search conditions upon reflection of the travel histories of the vehicle.

A description will now be given of the route search processing of the navigation apparatus 1 according to the second embodiment. Note that the present embodiment is only different from the first embodiment in the search condition setting process in the step S14 in the route search processing by the navigation apparatus 1 shown in FIG. 8, and the description is given with reference to FIG. 8 and other drawings. The processing shown in FIG. 8 starts upon the power being turned on, and ends upon the power being turned off. The turning on and off of the power is carried out by turning on/off the power of the navigation apparatus 1, or by turning on/off of the engine start key (ignition switch) of the vehicle.

The route setting condition display process in the step S11 shows the user the route setting condition screen on the display device 8. The present location detecting process in the step S12 detects the geographic coordinates (latitude, longitude, and height) of the mobile body carrying the navigation apparatus 1. Specifically, the GPS receiver 6 receives the radio waves from a plurality of satellites orbiting around the earth. The coordinate positions of the satellites, the time when the radio waves are transmitted from the respective satellites, and the time when the radio waves are received on the GPS receiver 6 are detected based on the radio waves from the respective satellites. The distances to the respective satellites are calculated from the above information. The obtained coordinate position of the mobile body is sent from the vehicle location calculating section 25 to the route search processing section 26 as present location data.

The destination setting process in the step S13 shows the destination setting screen P shown in FIG. 4, carries out the search based on an input telephone number upon setting the destination using the telephone number, for example, obtains the map data at the destination, and shows the cursor on the map. The destination setting ends at this point. If the destination setting is completed, the confirmation screen display processing is carried out, and the user can confirm the set destination on the confirmation screen. A search condition setting process in the step S14 shows the search condition setting screen Q shown in FIG. 9 so that various search conditions are set.

Figure 10:
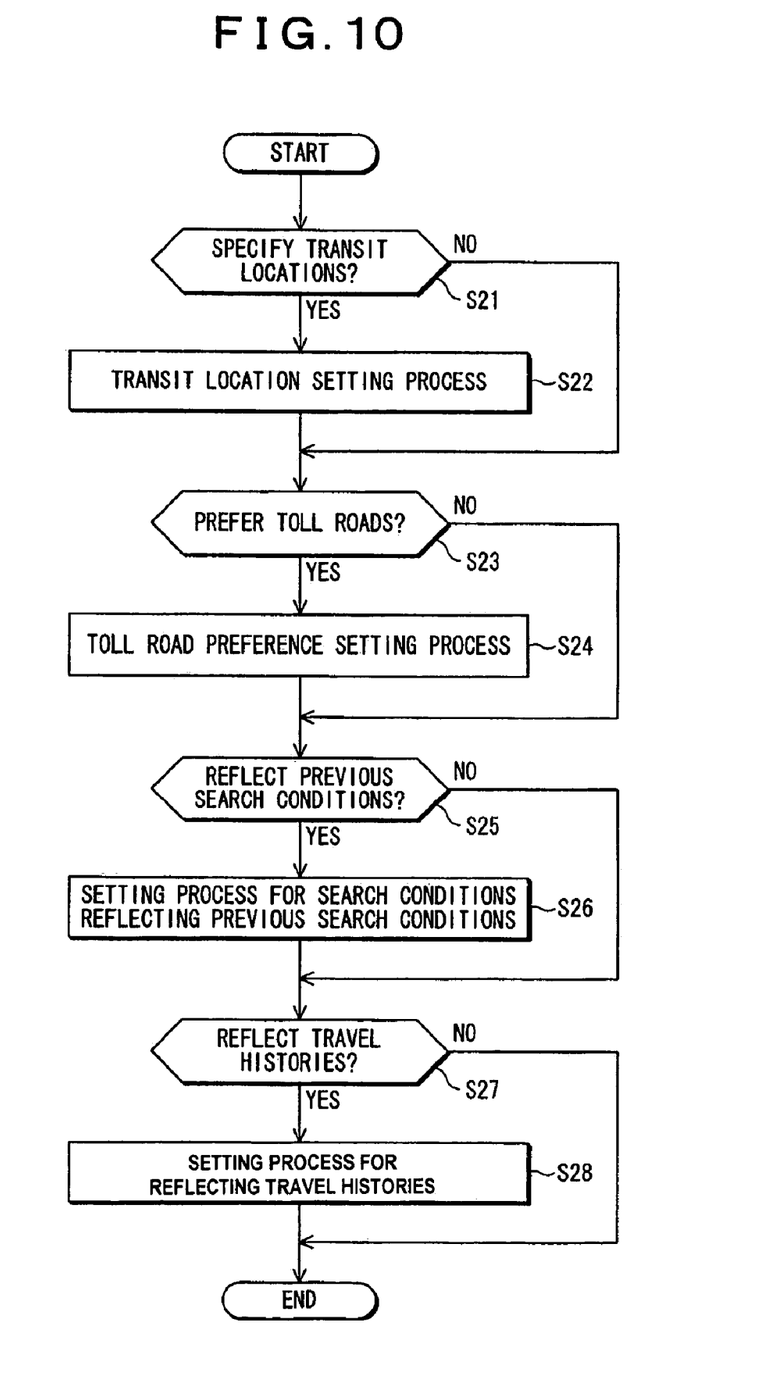
FIG. 10 is a flowchart of a search condition setting process.

FIG. 10 is a flowchart for the search condition setting process. It is determined whether the specification of the transit location is selected (S21), and if the specification of the transit location is selected, the transit location setting screen R shown in FIG. 6 appears. The user can specify transit locations on the transit location setting screen R. If the transit locations are specified, a transit location setting process is carried out according to the input transit locations (S22). It is then determined whether toll roads are preferred (S23), and if the preference for toll roads is selected, it is set such that the route search is carried out while toll roads are preferred (S24).

It is then determined whether the previous search conditions are to be reflected or considered (S25), and if the reflection of the previous search conditions is selected, the route search processing section 26 refers to the previous search conditions on the search condition/travel history memory 33, and sets the search conditions by reflecting the previous search conditions for the respective areas (S26). It is then determined whether the travel histories of the vehicle are to be reflected or considered (S27), and if the reflection of the travel histories of the vehicle is selected, the route search processing section 26 refers to the travel histories of the vehicle on the search condition/travel history memory 33, and sets the search conditions by reflecting the travel histories of the vehicle for the respective areas (S28). If the route search processing section 26 determines that there are a plurality of the search conditions, the route search processing section 26 shows an user interface which allows the change in the priority of the search conditions on the display device 8 via the operation image generating section 32 and the image synthesizing section 24.

Figure 11:
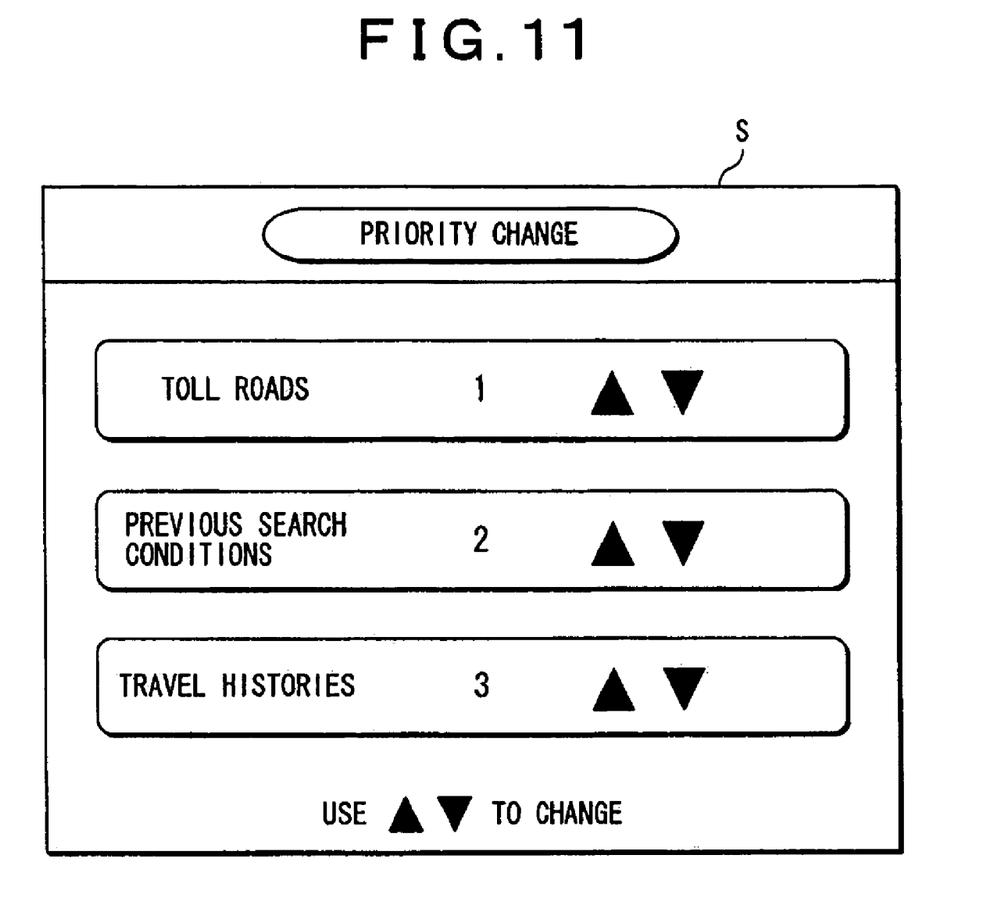
FIG. 11 shows a user interface used for changing the priorities of search conditions.

FIG. 11 shows the user interface used for changing the priority of the search conditions. In FIG. 11, the search conditions are prioritized in an order: the toll roads, previous search conditions, and travel histories. The user can operate the user interface by following instructions so as to change the priority of the search conditions.

With reference to FIG. 8 again, the route search process in the step S15 searches for the plurality of routes from the start position data to the destination data. If there are a plurality of the search conditions, the route search processing section 26 searches for routes such that the priority of the search conditions are reflected. The searched plurality of routes appear on the display device 8. The route selecting process in the step S16 selects one route from the plurality of routes searched by the route search process in the step S15. The guide/display process in the step S17 shows the guide route selected by the route selecting process in the step S16 on the display device 8.

According to the second embodiment, since the search conditions set previously are stored, and the search condition, which is the largest in number, is used for calculating the next transit location setting, for example, there are thus provided routes meeting the actual requirements and preferences of the respective drivers. Moreover, since the travel histories are stored, and the route is searched for based upon the travel histories, there are provided routes meeting the actual requirements and preferences of the respective drivers.

Note that the search condition/travel history memory 33 corresponds to the memory described in the claims.

Although the above description details the preferred embodiments of the present invention, the present invention is not limited to the relating specific embodiments, and various variations and modifications may be possible without departing from the spirit of the present invention defined in the claims. The configuration of the navigation apparatus 1 shown in FIG. 1 is merely an example, and the present invention is not limited to the configuration.

What is claimed is:

1. A navigation apparatus for carrying out a route search to a set destination, and subsequently providing route guidance according to a search result, comprising:
    a vehicle location calculating section configured to (a) calculate locations of a vehicle associated with the navigation apparatus as the vehicle is traveling and (b) store the locations calculated into a travel history memory to build a travel history of the vehicle;
    a route search processing section configured to subsequently (1) determines that a user travels more frequently in a first area associated with a first portion of a route from a start point to a destination than in a second area associated with a second portion of the route from the start point to the destination based upon the travel history of the vehicle stored in the travel history memory, the first area being different than the second area, (2) search for the first portion of the route from the start point to the destination running through the first area based upon a predetermined first search condition specific to the user, and (3) search for the second portion of the route from the start point to the destination running through the second area based upon a predetermined recommended second search condition.

2. The navigation apparatus according to claim 1, said route search processing section is configured to further distinguish between the first area along the route from the start point to the destination and the second area along the route from the start point to the destination based upon a search condition previously set.

3. The navigation apparatus according to claim 1, said route search processing section is configured to further distinguish between the first area along the route from the start point to the destination and the second area along the route from the start point to the destination based upon a predetermined registered content.

4. The navigation apparatus according to claim 3, said route search processing section is configured to uses the most recent registered content.

5. The navigation apparatus according to claim 1, said route search processing section is configured to search for the route from the start point to the destination using the search condition specific to the user on both sides of a transit location.

6. The navigation apparatus according to claim 1, upon there being a plurality of search conditions for either the first or second area, said route search processing section is configured to search for the route from the start point to the destination based upon a priority of the search conditions.

7. A navigation apparatus for carrying out a route search to a set destination, and subsequently providing route guidance according to a search result, comprising:

a route search processing section configured to search for a route from a start point to a destination based upon a travel history of a vehicle by (1) referring to the travel history to distinguish a first area from a second area along the route from the start point to the destination, (2) determining a first portion of the route from the start point to the destination running through the first area that satisfies a first condition, and (3) determining a second portion of the route from the start point to the destination running through the second area that satisfies a second condition different than the first condition.

8. A navigation apparatus for carrying out a route search to a set destination, and subsequently providing route guidance according to a search result, comprising:

means for distinguishing between a first area and a second area along a route from a start point to a destination based upon a frequency that a user drives in the first and second areas along the route from the start point to the destination, the first area being different than the second area; and means for (1) searching for a first portion of the route from the start point to the destination based upon a predetermined first search condition specific to the user in the first area, and (2) searching for a second portion of the route from the start point to the destination based upon a predetermined recommended second search condition in the second area.

9. A navigation apparatus for carrying out a route search to a set destination, and subsequently providing route guidance according to a search result, comprising:

means for storing a plurality of vehicle locations as a vehicle travels along a route as a travel history of the vehicle onto a predetermined memory;

means for distinguishing a first area from a second area between a starting location and a destination based upon the travel history of the vehicle; and means for searching for a single route from the starting location to the destination that satisfies (1) a first search condition in the first area and (2) a second search condition in the second area, the first search condition being different than the second search condition.

* * * * *

UNITED STATES PATENT AND TRADEMARK OFFICE
CERTIFICATE OF CORRECTION

PATENT NO. : 7,400,973 B2
APPLICATION NO. : 11/054360
DATED : July 15, 2008
INVENTOR(S) : Masaru Okochi

It is certified that error appears in the above-identified patent and that said Letters Patent is hereby corrected as shown below:

In the Claims

In column 12, in claim 4, line 56, after "section is configured to" delete "uses" and substitute --use-- in its place.

Signed and Sealed this

Third Day of February, 2009

JOHN DOLL
*Acting Director of the United States Patent and Trademark Office*